Dec. 18, 1956  R. L. CHAMBERS  2,774,545
FISHING REEL
Filed Oct. 6, 1955  2 Sheets-Sheet 1
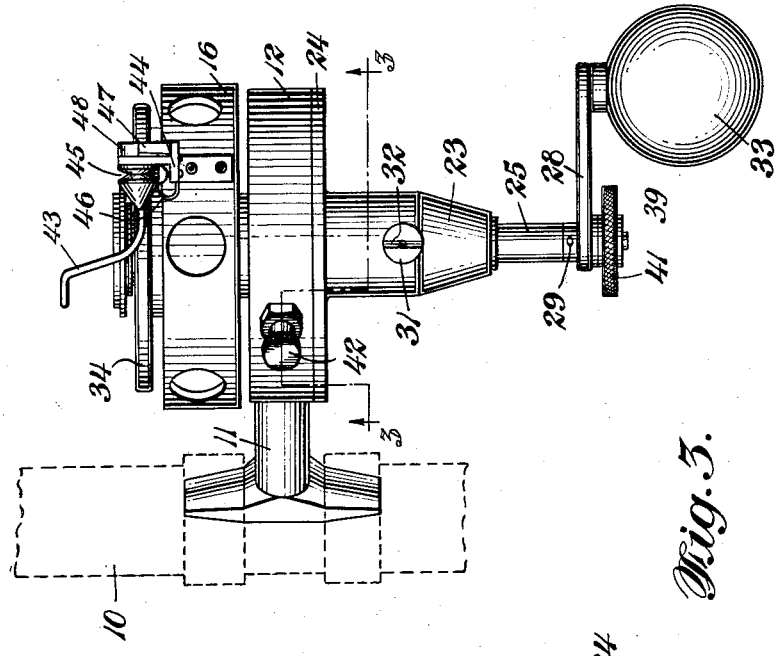
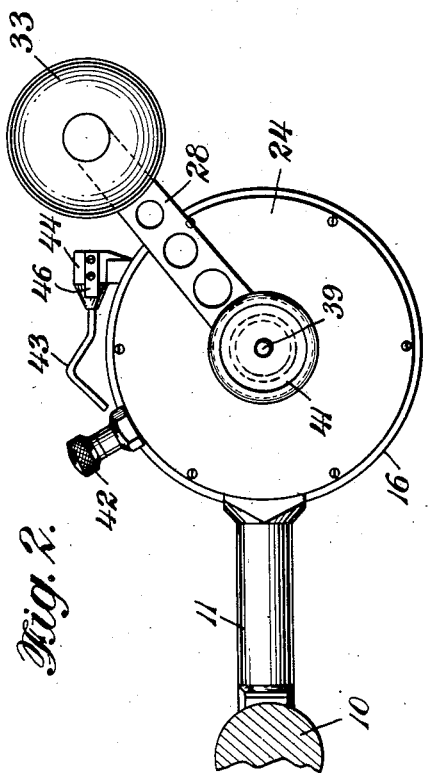
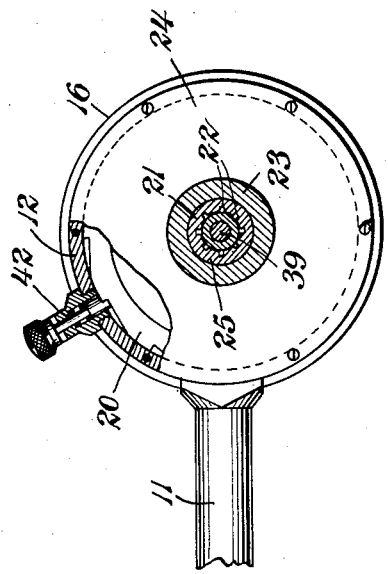
INVENTOR
Roy L. Chambers,
BY Walter S. Paul
ATTORNEY Dec. 18, 1956 R. L. CHAMBERS 2,774,545
FISHING REEL
Filed Oct. 6, 1955 2 Sheets-Sheet 2
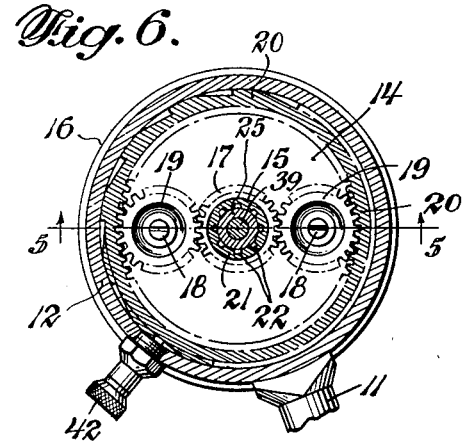
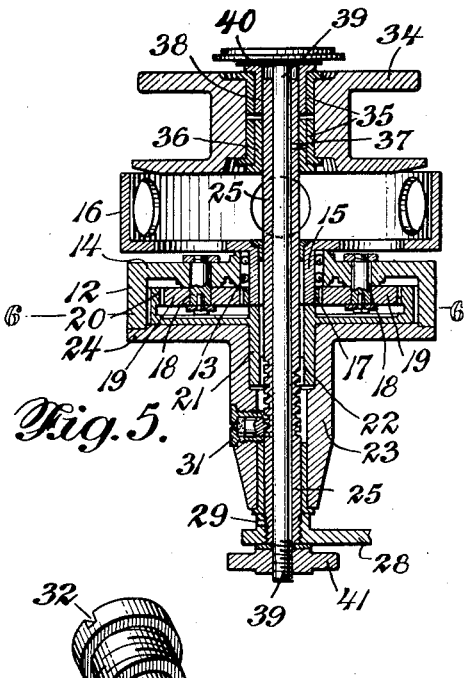
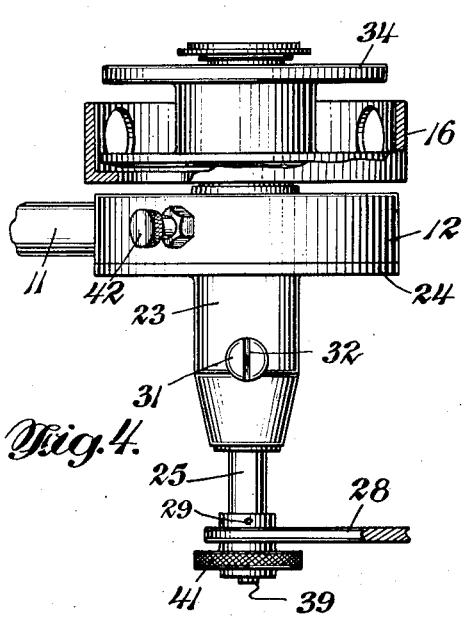
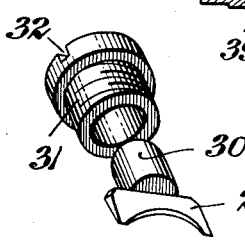
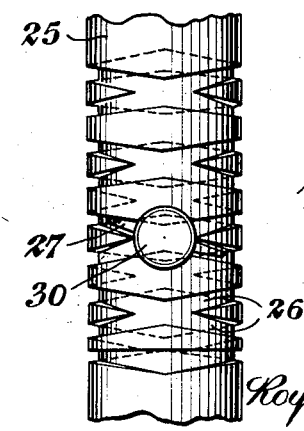
INVENTOR
Roy L. Chambers,
BY Walter S. Pavl
ATTORNEY

United States Patent Office 2,774,545
Patented Dec. 18, 1956

2,774,545

FISHING REEL

Roy L. Chambers, Washington, D. C.

Application October 6, 1955, Serial No. 538,824

7 Claims. (Cl. 242—84.4)

The present invention relates to high speed compact hooded fishing reels of large capacity.

The main object of this invention is to provide a simple sturdy reel mechanism for a high speed large capacity parallel winding hooded fishing reel with releasable ratchet means and adjustable friction clutch means.

A further object is to have the spool in the above mechanism mounted directly on the crank shaft, parallel to the fishing rod, and drive the hood with the line guide, through enclosed planetary gearing, from the crank shaft, at a multiple speed in the opposite direction, thus providing a higher aggregate winding speed on the spool.

A further object is to provide slow reciprocation of the crankshaft and spool in the above reel, during winding, to obtain even parallel turns on the spool.

A further object is to provide a handy crank handle, preferably substantially spherical, for easy angular manipulation from the rear of the spool.

A further object is to completely house the gearing and reciprocating means to protect them from foreign matter and facilitate lubrication of the moving parts.

Other more specific objects will becomes apparent in the following detailed description of an illustrative embodiment of the invention, as shown in the accompanying drawings, wherein:

Fig. 1 is a substantially top view of the tackle mounted on the butt end of a fishing rod, Fig. 2 is a rear view thereof, the butt end of the rod being shown in section, Fig. 3 is a rear sectional view taken on the line 3—3 of Fig. 1, Fig. 4 is a partial top view with a part of the hood broken away to show the spool, Fig. 5 is an axial cross section of the reel taken on the line 5—5 of Fig. 6, Fig. 6 is a sectional view taken on the line 6—6 of Fig. 5, Fig. 7 is an enlarged detail of the reverse threaded groove on the crankshaft, and Fig. 8 is an enlarged exploded detail perspective view of the swivelled spline for cooperation with the reverse threaded groove on the crankshaft, and of the bearing cap therefor.

The overall view of the illustrated device in Fig. 1 shows it mounted on the butt end of the fishing rod 10. The device comprises a conventional support arm 11 which may be made integral with or firmly attached to the gear housing 12 which may be provided with a ball bearing 13 in its front wall 14 for freely rotatably supporting the sleeve 15 of the hood 16. Sleeve 15 is provided with a gear 17 at its rear end.

The wall 14 also supports the pinion shafts 18 on which pinions 19 are mounted concentrically to mesh with the gear 17 at the center and with an internal ring gear 20 on the outside.

The ring gear 20 has a central sleeve 21 which is provided with internal axial grooves 22 and is rotatably mounted in a counterbore in the front end of a sleeve housing 23 extending rearwardly from the center of the housing cover 24 which closes off the rear of the gear housing 12. The grooves 22 in the ring gear sleeve 21 mesh with corresponding splines on the hollow crankshaft 25 to permit the crankshaft to reciprocate in response to the cooperation of its reverse threaded continuous groove 26 with the arcuate spline 27 which is swivably mounted for angular oscillation as it moves at the end of each reciprocation between the left and right handed portions of the groove, as the crankshaft is turned by means of the crank 28 fixed to its rear end as by pin 29. The swivel stud shaft 30 of the arcuate spline may be rotatably mounted in the socket of a hollow screw cap 31 adapted for mounting in the wall of sleeve housing 23 to close the opening provided therein for insertion of the spline. Screw cap 31 may be provided with a groove 32 for screwdriver operation at assembly, and may have an oil hole for injecting lubricant into the housing for lubrication of the moving parts.

The crank 28 is preferably provided with a substantially spherical handle 33 for easy manipulation from any angle, and with either the right or left hand.

The spool 34 may be fitted with a pair of flanged sleeves 35 and is rotatably mounted over flanged sleeve 36 fixed at the front end of the crankshaft 25 as by pin 37. The front edge of sleeve 36 may be castellated and a flanged sleeve 38 having interfitting castellations is inserted over it before the flat headed bolt 39 is passed through the front end of the hollow shaft with a flat spring washer 40 under the head. The bolt 39 has a threaded end on which the friction adjusting nut 41 is screwed for drawing the bolt head over the spring washer the desired amount for controlling the friction pressure in the clutch formed between the outer faces of the flanges of the sleeves 35 and the inner faces of the sleeves 36 and 38. This adjustment provides a very sensitive control of the drag desired to be put on the line.

A ratchet pin 42 may be suitably mounted on the housing 12 as shown for resiliently biasing against the toothed periphery of the ring gear 20 and having means for pulling it out to released position. This could be conveniently placed in the sleeve housing 23 close to the wall 24 and providing the cooperating ratchet teeth on the periphery of the ring gear sleeve 21.

A pick up finger 43 may be rotatably mounted in a bracket 44 fixed to the hood 16 as may be seen in Figs. 1 and 2. At the base of the finger is a conical guide for the line to run over into the annular guide groove 45. A leaf spring 46 having its outer end bent over the groove 45 keeps the line from leaving the groove accidentally. Another leaf spring 47, bent in a U-shape, is riveted in the middle to bracket 44 and has its ends biased on opposite sides of a cam 48 on the bearing end of the pick-up finger to frictionally hold the finger in operative or inoperative position when manually turned thereto. The cam has a shoulder stop that moves against one of the spring ends when the finger is turned into operating position to determine its proper location.

The weight of the hood 16 may be reduced by cutting out portions of its base plate and cylindrical wall, without reducing its strength. The reel 34 may be made of plastic material.

Instead of only two pinions 19, three or more may be used, if desired. Also different relative sizes of the gears may be adapted for other speed ratios of winding. In any event, whatever the gear ratio may be, an increased speed in reverse operation is provided for the hood and the attached line guide 45.

The speed of winding is the cumulative sum of the speed of rotation of the spool in one direction directly by the crank and the increased speed of the line guide in the opposite direction by the speed gearing. In the present illustration, with the hood gear and pinion gears being one-third the size of the ring gear, providing a speed-up of three to one to the hood in reverse direction, the cumulative speed of winding is four to one. The reverse threaded groove has four and one-half turns for each reciprocating direction. Thus, reciprocation in one direction is accompanied by four times four and one-half, or eighteen, winding turns of the line on the spool; so that parallel winding may be readily achieved by the use of a spool having a groove width at least equal to eighteen times the thickness of the heaviest line intended to be used on the spool, and of course, the length of the grooved portion of the crankshaft would have to be made substantially equal to this groove width. This will ensure even successive layers of the wound line on the spool, making a most compact winding, permitting maximum capacity in the space available, as well as smooth operation.

It might be desirable for some purposes to provide a stationary hood built around the present rotating hood 16 and fixed to the gear housing 12. Hood 16 might then be reduced to merely a rotating support for the bracket 44 and the pick-up finger device. This modification however would be considered a mere matter of design and it was therefore not deemed necessary to show it.

Many other obvious modifications in the form and arrangement of the details of this device may be made without departing from the spirit and scope of the present invention, as defined in the appended claims.

What is claimed is:

1. A fishing reel comprising a conventional support arm adapted for mounting on the butt end of a fishing rod, a gear frame, a speed-up gearing in said frame, a reciprocable crankshaft connected to said gearing for providing a drive in reverse direction and having a crank and handle fixed to its rear end and a spool mounted on its front end for direct turning by means of the crank-handle, a low-pitch thread means on said shaft for reciprocating it the width of said spool, and a rotor bracket having a line guide fixed thereto at the rim of said spool, said rotor being driven by said reverse drive, whereby said line guide will have a relative winding speed with respect to said spool equivalent to a gear ratio of one more than that of the speed-up gearing.

2. A fishing reel as defined in claim 1, said frame including a housing for said gearing and reciprocating thread means, said housing having a sleeve portion around said reciprocating means portion of said shaft, said reciprocating means including a continuous reverse threaded groove on said shaft and a cooperating swivelled spline arcuately formed to follow said groove oscillatably mounted in said sleeve for angularly turning in the groove as it changes its course, at the end of each reciprocation stroke of the crankshaft, between the right and left hand threaded portions of said groove.

3. A fishing reel as defined in claim 2, said spline having a swivel stud shaft, an opening in said sleeve for insertion of said spline into said groove, and a cap screw adapted to cover said opening and having a socket providing a bearing for said stud shaft, said oil hole being in said cap screw.

4. A fishing reel as defined in claim 1, said frame including a housing for said gearing and reciprocating means, said rotor being formed as a cylindrical hood into which the spool moves during reciprocation of said crankshaft.

5. A fishing reel as defined in claim 1, said frame including a housing for said gearing and reciprocating means, said crankshaft being hollow, and having friction clutch means between its front end and said spool, and pressure control means for said friction clutch extending through said hollow shaft for control operation at the rear end of said crankshaft.

6. A fishing reel as defined in claim 5, said friction clutch means comprising a pair of flanged coextensive sleeves on said crankshaft between said spool and said crankshaft, fixed against rotation relative to said crankshaft and the rear sleeve being also fixed against axial displacement on said shaft, said spool being rotatably mounted on said sleeves between said flanges for frictional drive by axial pressure applied on the front sleeve to bias its flange against said spool so as to provide friction between said spool and both said flanges, and a large headed bolt passed through said hollow shaft from its front end and extending through the rear end of said shaft, having a flat spring washer between its head and said front sleeve flange and a control thumb nut at its rear end to control the pressure and resulting friction between said spool and said flanges.

7. A fishing reel as defined in claim 6, said spool being lined with flanged bushings of wear resistant smooth friction material to facilitate fine adjustment of the friction desired.

References Cited in the file of this patent

UNITED STATES PATENTS

| | | |
|---|---|---|
| 2,515,896 | Rakoczy | July 18, 1950 |
| 2,705,113 | Bonanno | Mar. 29, 1955 |

FOREIGN PATENTS

| | | |
|---|---|---|
| 379,371 | Great Britain | Aug. 29, 1932 |
| 922,557 | Germany | Jan. 20, 1955 |